(12) United States Patent
Hunt et al.

(10) Patent No.: US 9,120,896 B2
(45) Date of Patent: Sep. 1, 2015

(54) POLYMERS CONTAINING METATHESIZED NATURAL OIL DERIVATIVES

(71) Applicant: ELEVANCE RENEWABLE SCIENCES, INC., Woodridge, IL (US)

(72) Inventors: Zachary Hunt, Simpsonville, SC (US); S. Alexander Christensen, Northwoods, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 34 days.

(21) Appl. No.: 14/036,377

(22) Filed: Sep. 25, 2013

(65) Prior Publication Data

US 2014/0094585 A1  Apr. 3, 2014

Related U.S. Application Data

(60) Provisional application No. 61/706,980, filed on Sep. 28, 2012.

(51) Int. Cl.
| | |
|---|---|
| C08G 18/10 | (2006.01) |
| C08G 71/04 | (2006.01) |
| C08G 18/32 | (2006.01) |
| C08G 18/42 | (2006.01) |
| C08G 18/66 | (2006.01) |
| C08G 18/46 | (2006.01) |

(52) U.S. Cl.
CPC ............ *C08G 71/04* (2013.01); *C08G 18/3203* (2013.01); *C08G 18/4233* (2013.01); *C08G 18/4288* (2013.01); *C08G 18/4615* (2013.01); *C08G 18/664* (2013.01)

(58) Field of Classification Search
CPC ........... C08G 18/3203; C08G 18/4288; C08G 18/4615; C08G 18/664
See application file for complete search history.

(56) References Cited

U.S. PATENT DOCUMENTS

| | | | | |
|---|---|---|---|---|
| 4,246,364 | A | * | 1/1981 | Koehler et al. ............... 521/167 |
| 5,039,732 | A |   | 8/1991 | Arora |
| 5,783,604 | A |   | 7/1998 | Garcia Nunez |
| 6,121,398 | A |   | 9/2000 | Wool et al. |
| 6,211,315 | B1 |   | 4/2001 | Larock et al. |
| 7,951,232 | B2 |   | 5/2011 | Zullo et al. |
| 7,960,599 | B2 |   | 6/2011 | Millis et al. |
| 8,021,443 | B2 |   | 9/2011 | Murphy et al. |

(Continued)

FOREIGN PATENT DOCUMENTS

| | | | | |
|---|---|---|---|---|
| GB | 1248919 | A | * 10/1971 | ............. C08G 18/36 |
| WO | 2008048522 | | 4/2008 | |

(Continued)

OTHER PUBLICATIONS

International Searching Authority, "International Search Report and Written Opinion for PCT/US13/61570", 2/4/114, Publisher: European Patent Office, Published in: EP.

(Continued)

*Primary Examiner* — Michael L Leonard
(74) *Attorney, Agent, or Firm* — Blanchard & Associates

(57) ABSTRACT

Polymers containing natural oil derivatives are generally disclosed. Methods of forming such polymers are also generally disclosed. In some embodiments, the polymer is a polyurethane. In some embodiments, the natural oil derivative is a cross-linking group that links two or more polymer chains together.

29 Claims, 1 Drawing Sheet

(56) References Cited

U.S. PATENT DOCUMENTS

| | | | |
|---|---|---|---|
| 8,067,610 | B2 | 11/2011 | Schrodi |
| 8,067,623 | B2 | 11/2011 | Lee |
| 8,070,833 | B2 | 12/2011 | Murphy |
| 8,115,021 | B2 | 2/2012 | Tupy et al. |
| 8,157,873 | B2 | 4/2012 | Murphy et al. |
| 8,202,329 | B2 | 6/2012 | Murphy et al. |
| 8,211,989 | B2 | 7/2012 | Such et al. |
| 2002/0095007 | A1 | 7/2002 | Larock et al. |
| 2003/0191273 | A1* | 10/2003 | Gertzmann et al. ............ 528/44 |
| 2006/0052568 | A1 | 3/2006 | Roesler et al. |
| 2006/0100349 | A1 | 5/2006 | Krishnan |
| 2008/0064891 | A1 | 3/2008 | Lee |
| 2008/0090956 | A1 | 4/2008 | Munzmay et al. |
| 2009/0114336 | A1 | 5/2009 | Zhu et al. |
| 2009/0126602 | A1 | 5/2009 | Murphy et al. |
| 2009/0149621 | A1 | 6/2009 | Krause et al. |
| 2009/0217568 | A1 | 9/2009 | Murphy et al. |
| 2009/0220443 | A1 | 9/2009 | Braksmayer et al. |
| 2009/0264669 | A1 | 10/2009 | Upshaw |
| 2009/0312450 | A1 | 12/2009 | Martin et al. |
| 2010/0047499 | A1 | 2/2010 | Braksmayer et al. |
| 2010/0094034 | A1 | 4/2010 | Kaido et al. |
| 2010/0132250 | A1 | 6/2010 | Uptain et al. |
| 2010/0160506 | A1 | 6/2010 | Wu et al. |
| 2010/0205851 | A1 | 8/2010 | Uptain et al. |
| 2011/0160472 | A1 | 6/2011 | Lemke et al. |
| 2011/0177344 | A1 | 7/2011 | Humphrey et al. |
| 2011/0190408 | A1 | 8/2011 | Casati et al. |
| 2012/0010303 | A1 | 1/2012 | Mujkic et al. |
| 2013/0225469 | A1 | 8/2013 | Allen et al. |
| 2013/0225470 | A1 | 8/2013 | Allen et al. |
| 2013/0225859 | A1 | 8/2013 | Allen et al. |

FOREIGN PATENT DOCUMENTS

| | | |
|---|---|---|
| WO | 2011124833 | 10/2011 |
| WO | 2012061092 | 5/2012 |
| WO | 2012061094 | 5/2012 |

OTHER PUBLICATIONS

Ahamad, et al., "Studies on a Newly Developed Linseed Oil-Based Alumina-Filled Polyesteramide Anticorrosive Coating", 1999, pp. 1679-1687, vol. 72.

Ahmad, et al., "A polyesteramide from Pongamia glabra oil for biologically safe anticorrosive coating", "Progress in Organic Coatings", 2003, pp. 95-102, vol. 47.

Ahmad, et al., "Development of Linseed Oil Based Polyesteramide without Organic Solvent at Lower Temperature", "Journal of Applied Polymer Science", 2007, pp. 1143-1148, vol. 104.

Kwon, et al., "Development of Low-VOC Waterborne Coatings Derived from Polyurethane Dispersions based on Natural Oil Polyols using High Throughput Methods", "Coatings Tech", 2010, pp. 30-37.

Montero De Espinosa, et al., "Plant Oils: The perfect renewable resource for polymer science?!", "European Polymer Journal", 2011, pp. 837-852, vol. 47.

Ng, et al., "Stearic acid coating on magnesium for enhacing corrosion resistance in Hank's solution", 2010, pp. 1823-1830, vol. 204.

Petrovic, et al., "Chapter 11: Plastics and Composites from Soybean Oil", "Natural Fibers, Plastics and Composites", 2004, pp. 167-170, Publisher: Kluwer Academic Publishers.

Refvik, et al., "The Chemistry of Metathesized Soybean Oil", "JAOCS", 1999, pp. 99-102, vol. 76, No. 1.

Yadav, et al., "Poly (urethance fatty amide) reson from linseed-oil—A renewable resource", "Progress in Organic Coatings ", 2009, pp. 27-32, vol. 64.

Zafar, et al., "Ambient-Cured Polyesteramide-Based Anticorrosive Coatings from Linseed Oil—A Sustainable Resource", "Journal of Applied Polymer Science", 2005, pp. 1818-1824, vol. 97.

Lees, Brian, "Polyurethanes—What Goes Into PUs?", Mar. 26, 2001, Publisher: www.azom.com/article.aspx?ArticleID=218.

* cited by examiner

POLYMERS CONTAINING METATHESIZED NATURAL OIL DERIVATIVES

CROSS-REFERENCE TO RELATED APPLICATIONS

The present applications claims the benefit of priority to U.S. Provisional Patent Application No. 61/706,980, filed Sep. 28, 2012, entitled "Polyurethanes Containing Metathesized Natural Oil Derivatives and Methods of Making", which is incorporated by reference as though fully set forth herein in its entirety.

TECHNICAL FIELD

Polymers containing natural oil derivatives are generally disclosed. Methods of forming such polymers are also generally disclosed. In some embodiments, the polymer is a polyurethane. In some embodiments, the natural oil derivative is a cross-linking group that links two or more polymer chains together.

BACKGROUND

Natural oils provide chemical species that differ in structure from those generally obtained from traditional petroleum refining processes. In many instances, natural oils contain multifunctional moieties that contain, among other features, an ester or acid group and an olefinic group. When these natural oils are refined, the products obtained from the refining process can yield unique compositions that can serve as useful building blocks for various chemical uses.

Polyurethanes are a class of polymers having chains of organic units joined by carbamate linkages, but which can include other linkages as well. Polyurethanes can have a wide variety of physical properties, which depend, among other factors, on the combination and arrangement of monomers used to make the polyurethane and on the degree of cross-linking. Further, in some instances, polyurethanes can contain multiple blocks, where certain blocks are hard or rigid while others are soft and flexible. Alteration of the chemical structure, size and/or frequency of these segments in a polyurethane can allow for modification of the properties of the resin. These options can lead to resins having a wide array of different properties. Some of these resins can be thermosetting, while others can be thermoplastic.

Polyurethane foams can be used for a number of different applications. Polyurethane foams may be flexible or rigid, and can be used in a variety of different applications, including, but not limited to, use for foam insulation, use in packaging materials, and use in cushioning. Polyurethanes can also be used as elastomers. Polyurethane elastomers can be solid or porous, with representative applications including, but not limited to, textile fibers, coatings, sealants, adhesives, and resilient pads. Polyurethanes can also be used as thermosetting polymers. Representative applications of polyurethane thermosets include, but are not limited to, abrasion resistant wheels, mechanical parts, and structural materials.

It is desirable to expand the chemical structures present in polyurethanes, so as to expand the useful properties that can be provided by the polymers. For example, properties such as flexibility, toughness, etc. can be improved by incorporating chemical groups that lower the modulus or that can absorb energy, respectively. This expansion of chemical structures may be accomplished through post-polymerization processing, such as reaction with other reagents or blending with other polymers. It is especially desirable, however, to expand the chemical structures by introducing new chemical structures in the monomeric building blocks from which the polymer is formed.

Thus, there is a continuing need to develop new materials that can be incorporated into polymeric materials, such as polyurethanes, so as to develop resins having new and useful properties. Preferably such modified polyurethanes can be formed using conventional synthetic techniques and equipment, without requiring post-polymerization treatment. Preferably the modified polyurethanes can be formed using building blocks that are readily available and inexpensive.

SUMMARY

In a first aspect, the disclosure provides polyurethanes, including one or more constitutional units according to formula (I):

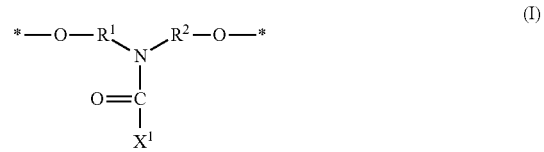

wherein:

$R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$;

$R^3$ is halogen, $C_{1-6}$ alkyl, —OH, $C_{1-6}$ alkoxy, —NH$_2$, —NH($C_{1-6}$ alkyl), —N($C_{1-6}$ alkyl)$_2$, $C_{1-6}$ haloalkyl, or $C_{1-6}$ haloalkoxy;

$X^1$ is $C_{4-28}$ alkyl or $C_{4-28}$ alkenyl, each of which is optionally substituted one or more times by groups selected independently from $R^3$; or $X^1$ is —$X^2$-$G^1$;

$X^2$ is $C_{4-28}$ alkylene or $C_{4-28}$ alkenylene, each of which is optionally substituted one or more times by groups selected independently from $R^3$;

$G^1$ is

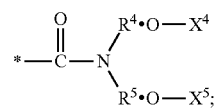

$R^4$ and $R^5$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$; and $X^4$ and $X^5$ are independently hydrogen or a polymer or polymer sequence, which is a polyurethane, a polyether, or a polyester.

In a second aspect, the disclosure provides methods including:

forming a reaction mixture comprising a short-chain diol, a diisocyanate, a long-chain polyol, and a compound of formula (Ia):

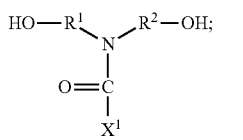

and forming a product mixture comprising a polyurethane resin formed from the short-chain diol, the diisocyanate, the long-chain polyol, and the compound of formula (Ia); wherein:

$R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$;

$R^3$ is halogen, $C_{1-6}$ alkyl, —OH, $C_{1-6}$ alkoxy, —NH$_2$, —NH($C_{1-6}$ alkyl), —N($C_{1-6}$ alkyl)$_2$, $C_{1-6}$ haloalkyl, or $C_{1-6}$ haloalkoxy;

$X^1$ is $C_{4-28}$ alkyl or $C_{4-28}$ alkenyl, each of which is optionally substituted one or more times by groups selected independently from $R^3$; or $X^1$ is —$X^2$-$G^1$;

$X^2$ is $C_{4-28}$ alkylene or $C_{4-28}$ alkenylene, each of which is optionally substituted one or more times by groups selected independently from $R^3$;

$G^1$ is

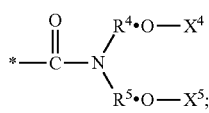

$R^4$ and $R^5$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$; and $X^4$ and $X^5$ are independently hydrogen or a polymer or polymer sequence, which is a polyurethane, a polyether, or a polyester.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
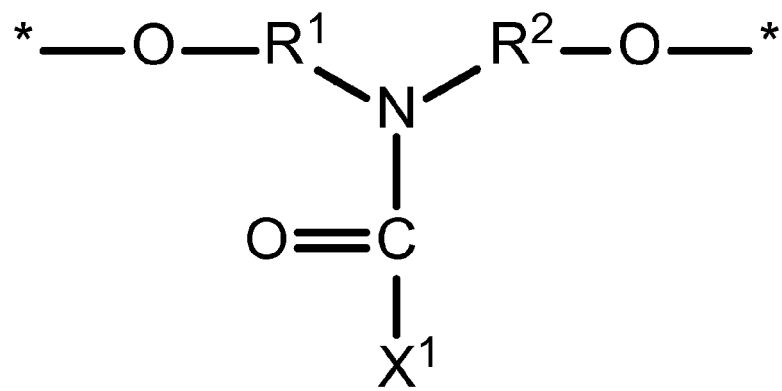
FIG. 1 depicts a constitutional unit included in polyurethanes of the present disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

DEFINITIONS

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks.

As used herein, "monomer" refers to a substance that can undergo a polymerization reaction to contribute constitutional units to the chemical structure of a polymer.

As used herein, "prepolymer" refers to a polymer that can undergo further reaction to contribute constitutional units to the chemical structure of a different polymer.

As used herein, "polymer sequence" refers generically to any species formed from a reaction of monomers. In some instances, a "polymer sequence" can refer to an entire polymer molecule or copolymer molecule, such as, for example, with a homopolymer or an alternating copolymer. In other instances, a "polymer sequence" can refer to a portion of a polymer molecule, such as a block within a block copolymer.

As used herein, "copolymer" refers to a polymer having constitutional units formed from more than one species of monomer.

As used herein, "block copolymer" refers to a copolymer having two or more different blocks of polymerized monomers, i.e., different polymer sequences.

As used herein, "polyurethane" refers to a polymer comprising two or more urethane linkages. Other types of linkages can be included, however. For example, in some instances, two isocyanate groups can react, thereby forming a urea linkage. In some other instances, a urea or urethane group can further react to form further groups, including, but not limited to, an allophanate group, a biuret group, or a cyclic isocyanurate group. In some embodiments, at least 70%, or at least 80%, or at least 90%, or at least 95% of the linkages in the polyurethane are urethane linkages. Further, in the context of a block copolymer, the term "polyurethane" can refer to the entire block copolymer, even though one or more blocks within the block copolymer may contain few, if any, urethane linkages. For example, in some polyurethane block copolymers, at least one of the blocks is a polyether sequence or a polyester sequence and one or more other blocks are polyurethane sequences.

As used herein, "polyester" refers to a polymer comprising two or more ester linkages. Other types of linkages can be included, however. In some embodiments, at least 80%, or at least 90%, or at least 95% of the linkages in the polyester are ester linkages. The term can refer to an entire polymer molecule, or can also refer to a particular polymer sequence, such as a block within a block copolymer.

As used herein, "polyether" refers to a polymer comprising two or more ether linkages. Other types of linkages can be included, however. In some embodiments, at least 80%, or at least 90%, or at least 95% of the linkages in the polyether are ether linkages. The term can refer to an entire polymer molecule, or can also refer to a particular polymer sequence, such as a block within a block copolymer.

As used herein, "reaction" and "chemical reaction" refer to the conversion of a substance into a product, irrespective of reagents or mechanisms involved.

As used herein, "reaction product" refers to a substance produced from a chemical reaction of one or more reactant substances.

The term "group" refers to a linked collection of atoms or a single atom within a molecular entity, where a molecular entity is any constitutionally or isotopically distinct atom, molecule, ion, ion pair, radical, radical ion, complex, conformer etc., identifiable as a separately distinguishable entity. The description of a group as being "formed by" a particular chemical transformation does not imply that this chemical transformation is involved in making the molecular entity that includes the group.

The term "functional group" refers to a group that includes one or a plurality of atoms other than hydrogen and sp$^3$ carbon atoms. Examples of functional groups include but are not limited to hydroxyl, protected hydroxyl, ether, ketone, ester, carboxylic acid, cyano, amido, isocyanate, urethane, urea, protected amino, thiol, sulfone, sulfoxide, phosphine, phosphite, phosphate, halide, and the like.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "metathesis catalyst" includes any catalyst or catalyst system that catalyzes an olefin metathesis reaction.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin matethesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

The term "metathesized natural oil" refers to the metathesis reaction product of a natural oil in the presence of a metathesis catalyst, where the metathesis product includes a new olefinic compound. A metathesized natural oil may include a reaction product of two triglycerides in a natural feedstock (self-metathesis) in the presence of a metathesis catalyst, where each triglyceride has an unsaturated carbon-carbon double bond, and where the reaction product includes a "natural oil oligomer" having a new mixture of olefins and esters that may include one or more of metathesis monomers, metathesis dimers, metathesis trimers, metathesis tetramers, metathesis pentamers, and higher order metathesis oligomers (e.g., metathesis hexamers). A metathesized natural oil may include a reaction product of a natural oil that includes more than one source of natural oil (e.g., a mixture of soybean oil and palm oil). A metathesized natural oil may include a reaction product of a natural oil that includes a mixture of natural oils and natural oil derivatives.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. The term "hydroxyl" refers to a —OH moiety. In some cases, an alcohol can have more than two or more hydroxyl groups. As used herein, "diol" and "polyol" refer to alcohols having two or more hydroxyl groups.

As used herein, "amine" or "amines" refer to compounds having the general formula: R—N(R')(R"), wherein R, R', and R" denote a hydrogen or an organic moiety (such as alkyl, aryl, or silyl groups), including those bearing heteroatom-containing substituent groups. In certain embodiments, R, R', and R" denote a hydrogen or an alkyl, alkenyl, aryl, or alcohol groups. In certain embodiments, the term "amines" may refer to a group of compounds with the general formula described above, wherein the compounds have different carbon lengths. The term "amino" refers to a —N(R)(R') moiety. In some cases, an alcohol can have more than two or more amino groups. As used herein, "diamine" and "polyamine" refer to amines having two or more amino groups.

As used herein, "isocyanate" or "isocyanates" refer to compounds having the general formula: R—NCO, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "isocyanate" or "isocyanates" may refer to a group of compounds with the general formula described above, wherein the compounds have different carbon lengths. The term "isocyanato" refers to a —NCO moiety. In some cases, an isocyanate can have more than two or more isocyanato groups. As used herein, "diisocyanate" and "polyisocyanate" refer to isocyanates having two or more isocyanato groups.

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 8 carbon atoms.

As used herein, "alpha-olefin" refers to an olefin (as defined above) that has a terminal carbon-carbon double bond. In some embodiments, the alpha-olefin is a terminal alkene, which is an alkene (as defined above) having a terminal carbon-carbon double bond. Additional carbon-carbon double bonds can be present.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl or alkylene group can be replaced by a heteroatom (e.g., selected from nitrogen, oxygen, or sulfur, including N-oxides, sulfur oxides, and sulfur dioxides, where feasible), and is referred to as a "heteroalkyl" or "heteroalkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group. Also, in some instances, one or more of the saturated carbon atoms in the alkenyl or alkenylene group can be replaced by a heteroatom (e.g., selected from nitrogen, oxygen, or sulfur, including N-oxides, sulfur oxides, and sulfur dioxides, where feasible), and is referred to as a "heteroalkenyl" or "heteroalkenylene" group.

As used herein, "alkynyl" refers to a straight or branched chain non-aromatic hydrocarbon having 2 to 30 carbon atoms and having one or more carbon-carbon triple bonds, which may be optionally substituted, as herein further described, with multiple degrees of substitution being allowed. Examples of "alkynyl," as used herein, include, but are not limited to, ethynyl, 2-propynyl, 2-butynyl, and 3-butynyl. The number carbon atoms in an alkynyl group is represented by the phrase "$C_{x-y}$ alkynyl," which refers to an alkynyl group, as herein defined, containing from x to y, inclusive, carbon atoms. Thus, "$C_{2-6}$ alkynyl" represents an alkynyl chain having from 2 to 6 carbon atoms and, for example, includes, but is not limited to, ethynyl, 2-propynyl, 2-butynyl, and 3-butynyl. In some instances, the "alkynyl" group can be divalent, in which case the group can alternatively be referred to as an "alkynylene" group. Also, in some instances, one or more of the saturated carbon atoms in the alkynyl or alkynylene group can be replaced by a heteroatom (e.g., selected from nitrogen, oxygen, or sulfur, including N-oxides, sulfur oxides, and sulfur dioxides, where feasible), and is referred to as a "heteroalkynyl" or "heteroalkynylene" group.

As used herein, "cycloalkyl" refers to a 3- to 24-membered, cyclic hydrocarbon group, which may be optionally substituted as herein further described, with multiple degrees of substitution being allowed. Such "cycloalkyl" groups are monocyclic or polycyclic. The term "cycloalkyl," as used herein, does not include ring systems that contain aromatic rings, but does include ring systems that can have one or more degrees of unsaturation. Examples of "cycloalkyl" groups, as used herein, include, but are not limited to, cyclopropyl, cyclobutyl, cyclopentyl, cyclohexyl, cycloheptyl, 1-norbornyl, 2-norbornyl, 7-norbornyl, 1-adamantyl, and 2-adamantyl. In some instances, the "cycloalkyl" group can be divalent, in which case the group can alternatively be referred to as a "cycloalkylene" group. Also, in some instances, one or more of the carbon atoms in the cycloalkyl or cycloalkylene group can be replaced by a heteroatom (e.g., selected from nitrogen, oxygen, or sulfur, including N-oxides, sulfur oxides, and sulfur dioxides, where feasible), and is referred to as a "heterocycloalkyl" or "heterocycloalkylene" group.

As used herein, "aryl" refers to a 6- to 30-membered cyclic, aromatic hydrocarbon, which may be optionally substituted as herein further described, with multiple degrees of substitution being allowed. Examples of "aryl" groups as used herein include, but are not limited to, phenyl and naphthyl. As used herein, the term "aryl" also includes ring systems in which a phenyl or naphthyl group is optionally fused with one to three non-aromatic, saturated or unsaturated, carbocyclic rings. For example, "aryl" would include ring systems such as indene, with attachment possible to either the aromatic or the non-aromatic ring(s). In some instances, the "aryl" group can be divalent, in which case the group can alternatively be referred to as an "arylene" group. Also, as used herein, "arylalkyl" refers to an alkyl substituent (as defined above), which is further substituted by one or more (e.g., one to three) aryl groups (as herein defined). Analogously, "alkylaryl" refers to an aryl substituent, which is further substituted by one or more (e.g., one to five) alkyl groups.

As used herein, the term "heteroaryl" refers to a 5- to 30-membered mono- or polycyclic ring system, which contains at least one aromatic ring and also contains one or more heteroatoms. Such "heteroaryl" groups may be optionally substituted as herein further described, with multiple degrees of substitution being allowed. In a polycyclic "heteroaryl" group that contains at least one aromatic ring and at least one non-aromatic ring, the aromatic ring(s) need not contain a heteroatom. Thus, for example, "heteroaryl," as used herein, would include indolinyl. Further, the point of attachment may be to any ring within the ring system without regard to whether the ring containing the attachment point is aromatic or contains a heteroatom. Thus, for example, "heteroaryl," as used herein, would include indolin-1-yl, indolin-3-yl, and indolin-5-yl. Examples of heteroatoms include nitrogen, oxygen, or sulfur atoms, including N-oxides, sulfur oxides, and sulfur dioxides, where feasible. Examples of "heteroaryl" groups, as used herein include, but are not limited to, furyl, thiophenyl, pyrrolyl, oxazolyl, thiazolyl, imidazolyl, isoxazolyl, isothiazolyl, 1,2,4-triazolyl, pyrazolyl, pyridinyl, pyridazinyl, pyrimidinyl, indolyl, isoindolyl, benzo[b]thiophenyl, benzimidazolyl, benzothiazolyl, pteridinyl, and phenazinyl, where attachment can occur at any point on said rings, as long as attachment is chemically feasible. Thus, for example, "thiazolyl" refers to thiazol-2-yl, thiazol-4-yl, and thiaz-5-yl. In some instances, the "heteroaryl" group can be divalent, in which case the group can alternatively be referred to as a "heteroarylene" group. Also, as used herein, "heteroarylalkyl" refers to an alkyl substituent (as defined above), which is further substituted by one or more (e.g., one to three) heteroaryl groups (as herein defined). Analogously, "alkylheteroaryl" refers to an aryl substituent, which is further substituted by one or more (e.g., one to five) alkyl groups.

As used herein, "alkoxy" refers to —OR, where R is an alkyl group (as defined above). The number carbon atoms in an alkyl group is represented by the phrase "$C_{x-y}$ alkoxy," which refers to an alkoxy group having an alkyl group, as herein defined, containing from x to y, inclusive, carbon atoms.

As used herein, "halogen" or "halo" refers to fluorine, chlorine, bromine, and/or iodine. In some embodiments, the terms refer to fluorine and/or chlorine. As used herein, "haloalkyl" or "haloalkoxy" refer to alkyl or alkoxy groups, respectively, substituted by one or more halogen atoms. The terms "perfluoroalkyl" or "perfluoroalkoxy" refer to alkyl groups and alkoxy groups, respectively, where every available hydrogen is replaced by fluorine.

In some instances, the disclosure may refer to a "combination" or "combinations" of certain groups, which means that two or more of the preceding groups can combine to form a new group. For example, the phrase "R is alkylene, arylene, or combinations thereof" means that R can be a group that contains both alkykene and arylene groups, such as -(alkylene)-(arylene)-, -(arylene)-(alkylene)-, -(alkylene)(arylene)(alkylene)-, and the like.

As used herein, "substituted" refers to substitution of one or more hydrogens of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week, or a compound which maintains its integrity long enough to be useful for therapeutic or prophylactic administration to a patient. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Polymer Components Derived from Renewable Feedstocks

Due to the non-renewability of petroleum-based materials, it may be desirable to obtain some of the components of a polymer from certain renewable feedstocks. For example, in some embodiments, one or more components of a polymer can be obtained from certain renewable feedstocks, such as natural oils and their derivatives.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

Other techniques can also be used to convert renewable feedstocks to compounds useful as components for polymers. For example, one can use fermentation or use certain biological organisms to break down natural oils and release olefins and esters that can be used in polymeric materials or be modified to be used in polymeric materials.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linolenic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple methathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveda-Grubbs-type olefin metathesis catalyst and/or an entity derived therefrom. In some embodiments, the metathesis catalyst includes a second-generation Hoveda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the methathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Olefin Metathesis of Renewable Feedstocks

As noted above, olefin metathesis can be used to make one or more of the monomers that may be used in the polymers disclosed herein. In some embodiments, one or more of these monomers are made by metathesizing a natural oil. Any suitable natural oil or natural oil derivative can be used. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene, among other products, is formed. Following transesterification, for example, with an alkyl alcohol, an amount of 9-denenoic acid methyl ester is formed. In some such embodiments, a separation step may occur between the metathesis and the transesterification, where the alkenes are separated from the esters. In some other embodiments, transesterification can occur before metathesis, and the metathesis is performed on the transesterified product.

Diol Amides Derived from Natural Oils

In certain embodiments, the disclosure provides methods of incorporating diol amides that may be derived from natural oils into a polymer. In some embodiments, the diol amide is a compound of formula (Ia):

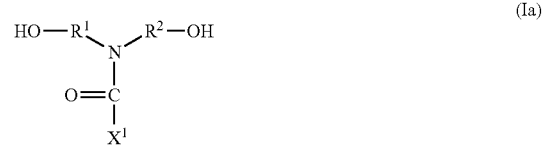

(Ia)

wherein:

$R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, C$_{2-20}$ heteroalkenylene, C$_{3-14}$ heterocycloaklylene, C$_{6-14}$ hetero-arylene, or any combination thereof, each of which is optionally substituted one or more times by groups selected independently from R$^3$;

R$^3$ is halogen, C$_{1-6}$ alkyl, —OH, C$_{1-6}$ alkoxy, —NH$_2$, —NH(C$_{1-6}$ alkyl), —N(C$_{1-6}$ alkyl)$_2$, C$_{1-6}$ haloalkyl, or C$_{1-6}$ haloalkoxy;

X$^1$ is C$_{4-28}$ alkyl or C$_{4-28}$ alkenyl, each of which is optionally substituted one or more times by groups selected independently from R$^3$; or X$^1$ is —X$^2$-G$^1$;

X$^2$ is C$_{4-28}$ alkylene or C$_{4-28}$ alkenylene, each of which is optionally substituted one or more times by groups selected independently from R$^3$;

G$^1$ is

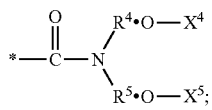

R$^4$ and R$^5$ are independently C$_{1-20}$ alkylene, C$_{2-20}$ alkenylene, C$_{3-14}$ cycloaklylene, C$_{6-14}$ arylene, C$_{1-20}$ heteroalkylene, C$_{2-20}$ heteroalkenylene, C$_{3-14}$ heterocycloaklylene, C$_{6-14}$ hetero-arylene, or any combination thereof, each of which is optionally substituted one or more times by groups selected independently from R$^3$; and X$^4$ and X$^5$ are independently hydrogen or a polymer or polymer sequence, which is a polyurethane, a polyether, or a polyester.

In some embodiments, R$^1$ and R$^2$ are independently C$_{1-20}$ alkylene, C$_{1-12}$ alkylene, C$_{1-8}$ alkylene, or C$_{1-6}$ alkylene. In some embodiments, these alkylene groups can be substituted one or more times with substituents selected independently from the group consisting of: halogen, C$_{1-6}$ alkyl, —OH, C$_{1-6}$ alkoxy, —NH$_2$, —NH(C$_{1-6}$ alkyl), —N(C$_{1-6}$ alkyl)$_2$, C$_{1-6}$ haloalkyl, and C$_{1-6}$ haloalkoxy. In some other embodiments, the alkylene groups are unsubstituted. In some such embodiments, R$^1$ and R$^2$ are independently methylene, dimethylene, trimethylene, tetramethylene, pentamethylene, hexamethylene, heptamethylene, or octamethylene. In some further such embodiments, R$^1$ and R$^2$ are independently methylene or dimethylene. In some other embodiments, R$^1$ and R$^2$ are dimethylene, thus making for a diethanolamine derivative, e.g., of an acid or ester derived from a natural oil.

In some further embodiments of any of the above embodiments, X$^1$ is C$_{4-28}$ alkenyl. In some further embodiments, X$^1$ is 8-nonenyl, 9-decenyl, or 10-undecenyl. In some other embodiments, X$^1$ is —X$^2$-G$^1$. In some such embodiments, X$^2$ is —(CH$_2$)$_7$—CH=CH—(CH$_2$)$_7$—, —(CH$_2$)$_7$—CH=CH—(CH$_2$)$_8$—, —(CH$_2$)$_7$—CH=CH—(CH$_2$)$_9$—, —(CH$_2$)$_8$—CH=CH—(CH$_2$)$_7$—, —(CH$_2$)$_8$—CH=CH—(CH$_2$)$_8$—, —(CH$_2$)$_8$—CH=CH—(CH$_2$)$_9$—, —(CH$_2$)$_9$—CH=CH—(CH$_2$)$_7$—, —(CH$_2$)$_9$—CH=CH—(CH$_2$)$_8$—, or —(CH$_2$)$_9$—CH=CH—(CH$_2$)$_9$—. In some such embodiments, R$^4$ and R$^5$ are independently C$_{1-8}$ alkylene, which is optionally substituted one or more times with substituents selected independently from R$^3$. In some such embodiments, R$^4$ and R$^5$ are independently —CH$_2$—, —(CH$_2$)$_2$—, —(CH$_2$)$_3$—, —(CH$_2$)$_4$—, —(CH$_2$)$_5$—, or —(CH$_2$)$_6$—. In some further such embodiments, R$^1$ and R$^2$ are —(CH$_2$)$_2$—. In some embodiments, X$^4$ and X$^5$ are hydrogen. In some other embodiments, at least one of X$^4$ and X$^5$ is a polymer or polymer sequence, such as a polyurethane, a polyester, or a polyether.

Compounds of formula (Ia) can be synthesized by any suitable technique known to those of skill in the art. As a non-limiting example, the synthesis is described herein for embodiments where the synthesized compound is an amide of a dialkanol amine. Such methods can be extended to other compounds of formula (Ia).

Dialkanol amides of formula (Ia) can be synthesized by reacting a dialkanol amine with an ester or acid compound, such as an ester or acid compound derived from a natural oil or its derivative. In some embodiments, the ester or acid compound is formed from the metathesis of a natural oil. In some such embodiments, the ester or acid is an unsaturated fatty acid or fatty acid ester, such as 9-decenoic acid, 10-undecenoic acid, 11-dodecenoic acid, or any alkyl esters thereof (e.g., methyl, ethyl, or isopropyl esters). In some other embodiments, the ester or acid is an unsaturated diacid or an ester thereof, such as 5-undecenedioic acid, 7-tetradecenedioic acid, 9-octodecenedioic acid, 9-nonadecenedioic acid, 9-eicosenedioic acid, 10-eicosenedioic acid, 10-henicosenedioic acid, 11-docosenedioic acid, or any alkyl esters thereof (e.g., methyl, ethyl, or isopropyl esters). Any of the aforementioned acids or esters can, in some embodiments, be saturated variants of these acids and esters. For example, the acid or ester can, in some embodiments, be decanoic acid, undecanoic acid, dodecanoic acid, or any alkyl esters thereof (e.g., methyl, ethyl, or isopropyl esters). In some other embodiments, the acid or ester can be undecanedioic acid, tetradecanedioic acid, octodecanedioic acid, nonadecanedioic acid, eicosanedioic acid, henicosanedioic acid, docosanedioic acid, or any alkyl esters thereof (e.g., methyl, ethyl, or isopropyl esters).

The reaction product of the acid or ester and the dialkanol amine may be formed by reacting the acid or ester and the dialkanol amine in a reaction mixture. The reaction mixture may also include a base or an acid. In some embodiments, the reaction mixture can be maintained at an elevated temperature, e.g., at least 50° C., or at least 75° C., or at least 100° C. The reaction mixture also can, in some embodiments, also include a solvent. The acid or ester, the dialkanol amine, and the optional acid or base can be added to the reaction mixture simultaneously, or can be added in sequence.

The acid or ester and the dialkanol amine can be added to the reaction mixture in any suitable amounts. In some embodiments, the amount of dialkanol amine present in the reaction mixture is from 0.1 percent by weight (wt %) to 50 wt % of the amount of acid or ester. The amount of dialkanol amine in the reaction mixture also may be expressed in terms of the ratio of amine equivalents in the dialkanol amine to ester/acid equivalents in the ester/acid (i.e., an A:E ratio). For example, in some embodiments, the A:E ratio is from 1:100 to 10:1, or from 1:10 to 5:1. In some other embodiments, the A:E ratio is about 1:3, or about 2:3, or about 1:2, or about 1:1.

In some embodiments, a base can be present in the reaction mixture, e.g., to increase the rate of reaction between the dialkanol amine and the acid or ester. Any suitable base can be used. Non-limiting examples of suitable bases include sodium carbonate, lithium carbonate, sodium methoxide, potassium hydroxide, sodium hydride, potassium butoxide, potassium carbonate, or mixtures of thereof. The base may be added to the reaction mixture neat or as a mixture with a solvent such as water, alcohol, or another organic solvent. In some embodiments, the amount of base in the reaction mixture is from 0.1 wt % to 10 wt % of the acid/ester in the reaction mixture, or from 1 wt % to 15 wt % of the acid/ester in the reaction mixture. In some embodiments, the amount of base in the reaction mixture may be from 1 wt % to 10 wt % of the acid/ester, or from 0.1 wt % to 1.0 wt % of the acid/ester, or from 0.01 wt % to 0.1 wt % of the acid/ester.

In some embodiments, the rate of reaction between the dialkanol amine and the acid or ester may be increased by heating the reaction mixture, with or without a base, to at least 100° C., at least 120° C., at least 140° C., at least 160° C., or between 100° C. and 200° C.

In some embodiments, the reaction between the dialkanol amine and the acid or ester may be carried out at an elevated temperature of from 80 to 250° C., or from 120 to 180° C., or from 120 to 160° C. In some embodiments, the reaction mixture may be maintained at the elevated temperature for up to 24 hours, for example from 1 to 24 hours, or from 4 to 24 hours. For example, the reaction mixture may be maintained at the elevated temperature for about 1 hour, about 2 hours, about 4 hours, or about 6 hours. In some embodiments, the reaction between the dialkanol amine and the acid or ester may be carried out in an inert atmosphere, such as in a nitrogen atmosphere or in a noble gas atmosphere. In some embodiments, the reaction may be carried out in an ambient atmosphere.

After reacting the dialkanol amine and the acid or ester, the reaction product may be isolated from the reaction mixture by removing volatile substances under vacuum. For example, the reaction mixture may be placed under a vacuum for up to an hour, e.g., from 30 to 60 minutes. Volatile substances may include but are not limited to, water, solvent, unreacted amine, and/or glycerol.

Polyurethane Synthesis

The disclosure provides polyurethanes, comprising one or more constitutional units according to formula (I):

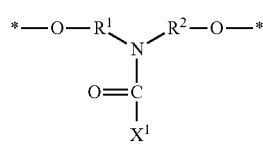

(I)

wherein:

$R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$;

$R^3$ is halogen, $C_{1-6}$ alkyl, —OH, $C_{1-6}$ alkoxy, —NH$_2$, —NH($C_{1-6}$ alkyl), —N($C_{1-6}$ alkyl)$_2$, $C_{1-6}$ haloalkyl, or $C_{1-6}$ haloalkoxy;

$X^1$ is $C_{4-28}$ alkyl or $C_{4-28}$ alkenyl, each of which is optionally substituted one or more times by groups selected independently from $R^3$; or $X^1$ is —$X^2$-$G^1$;

$X^2$ is $C_{4-28}$ alkylene or $C_{4-28}$ alkenylene, each of which is optionally substituted one or more times by groups selected independently from $R^3$;

$G^1$ is

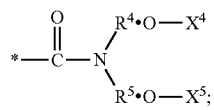

$R^4$ and $R^5$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$; and $X^4$ and $X^5$ are independently hydrogen or a polymer or polymer sequence.

FIG. 1 shows a chemical structure for a constitutional unit according to formula (I), where the variables are as defined in this disclosure. In embodiments where the polyurethane is a block copolymer, the constitutional unit according to formula (I) can be present in a first block (e.g., the polyurethane polymer sequence) or in a second block (e.g., a polyether or a polyester).

In some embodiments, $R^1$ and $R^2$ are independently $C_{1-20}$ alkylene, $C_{1-12}$ alkylene, $C_{1-8}$ alkylene, or $C_{1-6}$ alkylene. In some embodiments, these alkylene groups can be substituted one or more times with substituents selected independently from the group consisting of: halogen, $C_{1-6}$ alkyl, —OH, $C_{1-6}$ alkoxy, —NH$_2$, —NH($C_{1-6}$ alkyl), —N($C_{1-6}$ alkyl)$_2$, $C_{1-6}$ haloalkyl, and $C_{1-6}$ haloalkoxy. In some other embodiments, the alkylene groups are unsubstituted. In some such embodiments, $R^1$ and $R^2$ are independently methylene, dimethylene, trimethylene, tetramethylene, pentamethylene, hexamethylene, heptamethylene, or octamethylene. In some further such embodiments, $R^1$ and $R^2$ are independently methylene or dimethylene. In some other embodiments, $R^1$ and $R^2$ are dimethylene, thus making for a diethanolamine derivative, e.g., of an acid or ester derived from a natural oil.

In some further embodiments of any of the above embodiments, $X^1$ is $C_{4-28}$ alkenyl. In some further embodiments, $X^1$ is 8-nonenyl, 9-decenyl, or 10-undecenyl. In some other embodiments, $X^1$ is —$X^2$-$G^1$. In some such embodiments, $X^2$ is —(CH$_2$)$_7$—CH=CH—(CH$_2$)$_7$—, —(CH$_2$)$_7$—CH=CH—(CH$_2$)$_8$—, —(CH$_2$)$_7$—CH=CH—(CH$_2$)$_9$—, —(CH$_2$)$_8$—CH=CH—(CH$_2$)$_7$—, —(CH$_2$)$_8$—CH=CH—(CH$_2$)$_8$—, —(CH$_2$)$_8$—CH=CH—(CH$_2$)$_9$—, —(CH$_2$)$_9$—CH=CH—(CH$_2$)$_7$—, —(CH$_2$)$_9$—CH=CH—(CH$_2$)$_8$—, or —(CH$_2$)$_9$—CH=CH—(CH$_2$)$_9$—. In some such embodiments, $R^4$ and $R^5$ are independently $C_{1-8}$ alkylene, which is optionally substituted one or more times with substituents selected independently from $R^3$. In some such embodiments, $R^4$ and $R^5$ are independently —CH$_2$—, —(CH$_2$)$_2$—, —(CH$_2$)$_3$—, —(CH$_2$)$_4$—, —(CH$_2$)$_5$, or —(CH$_2$)$_6$—. In some further such embodiments, $R^1$ and $R^2$ are —(CH$_2$)$_2$—. In some embodiments, $X^4$ and $X^5$ are hydrogen. In some other embodiments, at least one of $X^4$ and $X^5$ is a polymer or polymer sequence. In some such embodiments, the polymer is a polyurethane, a polyester, or a polyether. In some other embodiments, the polymer is a polyurethane.

The polyurethanes disclosed herein are polymers that include carbamate or urethane linkages. The polyurethanes can also include other linkages, including, but not limited to, urea linkages, amide linkages, ester linkages, ether linkages, and the like. In some embodiments, the polyurethanes are block copolymers comprising two or more different blocks. In some such embodiments, the polyurethane comprises first block and a second block.

The first block is formed from a reaction mixture that comprises a short-chain diol, and a diisocyanate. In some further such embodiments, the reaction mixture further comprises a compound of formula (Ia):

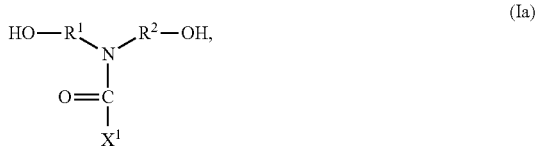

(Ia)

wherein $R^1$, $R^2$, and $X^1$ are as defined in the embodiments above.

The short-chain diol and the compound of formula (Ia) can be included in the reaction mixture in any suitable relative amounts. In some embodiments, the mole-to-mole ratio of the short-chain diol to the compound of formula (Ia) in the reaction mixture is at least 5:1, or at least 10:1, or at least 25:1, or at least 50:1, or at least 100:1, or at least 200:1.

The polyurethanes disclosed herein can include any suitable short-chain diol, sometimes referred to as a "chain extender." In some embodiments, the short-chain diol has a molecular weight of no more than 500 g/mol, or no more than 400 g/mol, or no more than 300 g/mol, or no more than 200 g/mol.

In some embodiments, the short-chain diol is a compound of formula (II):

wherein:

$X^{11}$ is $C_{1-20}$ alkylene, $C_{2-20}$ alkenylene, $C_{3-14}$ cycloalkylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^{11}$; and $R^{11}$ is halogen, $C_{1-6}$ alkyl, —OH, $C_{1-6}$ alkoxy, —NH$_2$, —NH($C_{1-6}$ alkyl), —N($C_{1-6}$ alkyl)$_2$, $C_{1-6}$ haloalkyl, or $C_{1-6}$ haloalkoxy.

In some embodiments, $X^{11}$ is $C_{1-20}$ alkylene or $C_{2-20}$ polyalkyleneoxide. In some embodiments, the short-chain diol is ethylene glycol, diethylene glycol, triethylene glycol, tetraethylene glycol, pentaethylene glycol, propylene glycol, dipropylene glycol, tripropylene glycol, tetrapropylene glycol, 1,3-propanediol, 1,3-butanediol, 1,4-butanediol, neopentyl glycol, 1,5-pentanediol, 1,6-hexanediol, 1,4-cyclohexanedimethanol, hydroquinone bis(2-hydroxyethyl)ether, or p-di-(2-hydroxyethoxy)benzene.

The reaction mixture can include any suitable diisocyanate. In some embodiments, the diisocyanate has a molecular weight of no more than 300 g/mol, or no more than 200 g/mol. In some embodiments, the diisocyanate is a toluene diisocyanate, a methylene diphenyl diisocyanate, a naphthalene diisocyanate, or hexamethylene diisocyanate. In some other embodiments, the diisocyanate is 4,4'-diphenylmethane diisocyanate (MDI), toluene 2,4-diisocyanate (2,4-TDI), toluene 2,6-diisocyanate (2,6-TDI), 1,5'-naphthalene diisocyanate (NDI), hexamethylene diisocyanate (HDI), isophorone diisocyanate, 1,3-xylylene diisocyanate (XDI), 1,1,4,4-tetramethylxylylene diisocyanate (p-TMXDI and/or m-TMXDI), 1,4-cyclohexane diisocyanate (CHDI), 1,1'-methylene-bis-4(-isocyanatocyclohexane) (H12MDI), or a mixture thereof. In some embodiments, the diisocyanate is 4,4'-diphenylmethane diisocyanate (MDI).

In some embodiments, the reaction mixture used to form the first block can further comprise one or more additional monomers. Any suitable monomers can be used, as long as they can react with one or more of the other monomers present in the reaction mixture. In some embodiments, the further monomer is an amine, such as a diamine. Suitable amines include, but are not limited to, diethyltoluenediamine, methylene bis(p-aminobenzene) (MDA), 3,3'-dichloro-4,4'-diaminodiphenylmethane (MBOCA), 3,3',5,5'-tetraisopropyl-4,4'-diaminodiphenylmethane, 3,5-dimethyl-3',5'-diisopropyl-4,4'-diaminophenylmethane, 3,5-diethyl-2,4-toluenediamine, 3,5-diethyl-2,6-toluenediamine, 4,4'-methylene-bis-(3-chloro-2,6-diethylaniline), 3,5-dimethylthio-2,4-toluenediamine, 3,5-dimethylthio-2,6-toluenediamine, 3,5-diamino-4-chlorobenzoic acid-isobutylester, and 4,4'-methylene-bis(3-chloro-2,6-diethylaniline) (MCDEA).

As noted above, in some embodiments, the polyurethanes disclosed herein can include a second block. In some embodiments, the second block comprises a polymer sequence, e.g., having a molecular weight of 1,000 Da or more. In some embodiments, the second block comprises a polymer sequence selected from the group consisting of: a polyether, a polyester, a polycarbonate, a polycaprolactone, a polybutadiene, and a polysulfide. In some embodiments, the second block comprises a polyester. In some other embodiments, the second block comprises a polyether.

The polymer sequence comprised by the second block can have any suitable molecular weight. For example, in some embodiments, the polymer sequence has a molecular weight of 1,000 Da to 20,000 Da, or a molecular weight of 2,000 Da to 10,000 Da.

In some embodiments, the polymer sequence comprised by the second block also includes one or more constitutional units according to formula (I) (e.g., according to any of the above embodiments). The constitutional units according to formula (I) can be included in the polymer (or polymer sequence) in any suitable amount. In some embodiments, the constitutional units of formula (I) make up no more than 5%, or no more than 3%, or no more than 2%, or no more than 1%, of the constitutional units in the polymer sequence, based on the total number of constitutional units in the polymer sequence.

In some embodiments, for example, where the polyurethane is a block copolymer, one of the blocks can be formed from a long-chain polyol, i.e., a polyol prepolymer. Any suitable long-chain polyol can be used. In some embodiments, the long-chain polyol is a polyether polyol, a polyester polyol, a polycarbonate polyol, a polycaprolactone polyol, a polybutadiene polyol, a polysulfide polyol, or a mixture thereof. In some embodiments, the long-chain polyol is a polyether polyol. In some embodiments, the long-chain polyol is a polyester polyol.

In some other embodiments, the long-chain polyol is a prepolymer having two or more hydroxyl functional groups, such as a prepolymer in the form of a chain having two ends, where each end includes a hydroxyl functional group. Examples of such prepolymers include but are not limited to poly(alkylene ether) polyols, polyester polyols, polycarbonate polyols having molecular weights from 250 to 10,000 daltons, and the like, and combinations thereof. Poly(alkylene ether) polyols may be formed, for example, by polymerizing cyclic ethers, glycols and dihydroxyethers. Examples of poly(alkylene ether) polyols include but are not limited to poly(propylene glycol) and polytetramethylene ether glycols (PTMEG). Polyester polyols may be formed, for example, by polymerizing caprolactone or by reacting dibasic acids such as adipic, glutaric, sebacic and/or phthalic acid with diols such as ethylene glycol, 1,2-propylene glycol, 1,4-butylene glycol, diethylene glycol and/or 1,6-hexanediol, and/or with substances having three or more hydroxyl functional groups such as glycerol, trimethylolpropane, pentaerythritol and/or sorbitol. Examples of polyester polyols include but are not limited to poly(diethylene glycol adipate).

A prepolymer in the form of a chain having two ends, where each end includes a hydroxyl functional group, also may be formed from the reaction of one or more monomers having at least two isocyanate functional groups, with an excess of one or more monomers having at least two hydroxyl functional groups and not including a derivative of a metathesized natural oil.

The polyurethanes disclosed herein can be prepared in any suitable manner. In some embodiments, for example, where the polyurethane is a block copolymer, one of the blocks comprises a polyurethane sequence. In some embodiments, the polyurethane sequence is formed by initially forming a polyurethane prepolymer, which is formed from a reaction mixture comprising a diol and a diisocyanate. In some embodiments, the diol is a short-chain diol, such as described in any of the above embodiments. In some embodiments, the diisocyanate is a diisocyanate according to any of the above embodiments. As also noted above, the reaction mixture can further comprise a compound of formula (Ia) and/or an additional monomer, such as an amine.

In some embodiments, the reaction mixture does not include the long-chain polyol. In such embodiments, a polyurethane prepolymer is formed from the reaction mixture. In such instances, the polyurethane prepolymer can be formed, and then subsequently reacted with one or more long-chain polyols to form a polyurethane block copolymer. These polyurethane prepolymers can have any suitable molecular weight. In some embodiments, the polyurethane prepolymer has a molecular weight of 500 to 5,000 Da. In some other embodiments, the polyurethane prepolymer has a molecular weight of 1,000 to 4,000 Da.

Figure 2:
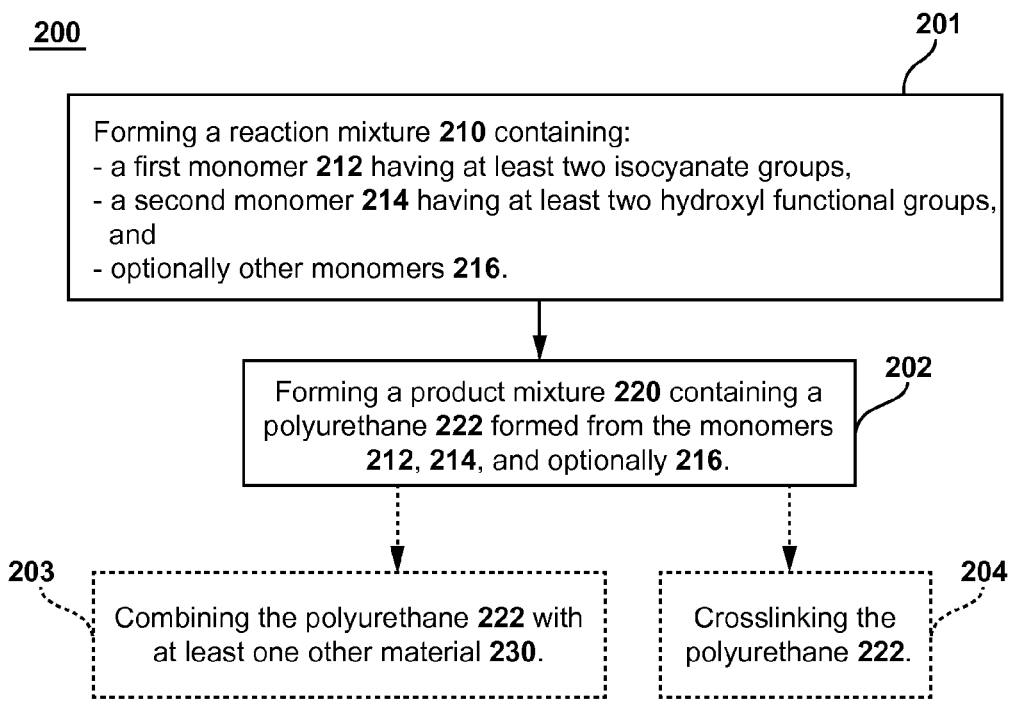
FIG. 2 depicts chemical structures and a reaction scheme for an example of a method of forming a copolymer according to one or more of the disclosed embodiments.

FIG. 2 depicts a method 200 of making a polymeric composition. The method 200 includes forming 201a reaction mixture 210 containing a first monomer 212 having at least two isocyanate functional groups, a second monomer 214 having at least two hydroxyl functional groups, and optionally other monomers 216; forming 202 a product mixture 220 containing a polyurethane 222 formed from the monomers 212, 214 and optionally 216; optionally combining 203 the polyurethane 222 with at least one other material 230; and/or optionally crosslinking 204 the polyurethane 222.

The first monomer 212 may include any substance having two or more isocyanate functional groups, such as the isocyanate-functionalized monomers described above. The first monomer 212 may include a mixture of different substances having two or more isocyanate functional groups, including a mixture of one or more diisocyanate monomers, one or more triisocyanate monomers, and/or one or more prepolymers having two or more isocyanate functional groups.

The second monomer 214 may include any substance having at least two hydroxyl functional groups that is a reaction product of a metathesized natural oil and a bis(hydroxyalkyl) amine, as described above. The monomer 214 may include a mixture of different substances that have at least two hydroxyl functional groups and that are reaction products of a metathesized natural oil and a bis(hydroxyalkyl)amine.

The optional other monomers 216 may include a third monomer having two or more hydroxyl functional groups, but not including a derivative of a metathesized natural oil. The optional other monomers 216 may include a fourth monomer having one or more amine functional groups.

The reaction mixture 210 also may include one or more other substances, such as a solvent, a catalyst, a blowing agent, a filler, a stabilizer, an antioxidant, a flame retardant, a plasticizer, a colorant or dye, and/or a fragrance. Examples of catalysts for forming polyurethanes include but are not limited to alkyltin compounds such as stannous 2-ethylhexanoate and dibutyltin dilaurate, carboxylate complexes of other metals, tertiary amines such as diazabicyclo[2.2.2]octane (DABCO), and mixtures of these. Examples of blowing agents for polyurethanes include but are not limited to volatile liquids such as dichloromethane. Examples of fillers include but are not limited to particulate salts such as calcium carbonate, particles or fibers containing a ceramic such as glass, particles or fibers containing graphite or other forms of carbon, and particles or fibers containing a polymer. Examples of stabilizers include but are not limited to acid stabilizers such as chloropropionic acid, dialkylphosphates, p-toluene sulfonic acid, and acid chlorides such as benzoic acid chloride and phthalic acid dichloride.

The forming 202 a product mixture 220 containing a polyurethane 222 may include heating the reaction mixture 210. In some embodiments, heating the reaction mixture may include maintaining the reaction mixture at a temperature of from about 30° C. to about 150° C. for a time sufficient to form a polyurethane 222. In some embodiments, the reaction mixture temperature may be from about 30° C. to about 100° C., or from about 50° C. to about 85° C. In some embodiments, the reaction mixture may be maintained at a temperature within these ranges for a period of from about 1 hour to about 48 hours, including but not limited to from about 1 hour to about 24 hours, and from about 2 hours to about 8 hours. A polyurethane 222 may be formed at a lower temperature and/or within a shorter period of time if the reaction mixture 210 includes a catalyst for forming polyurethanes, such as those described above.

The optionally combining 203 the polyurethane 222 with at least one other material 230 may include forming a homogenous or heterogeneous blend of the polyurethane 222 with another polymer. For example, a thermoplastic polyurethane elastomer (TPU) may be blended with a polyolefin elastomer to provide an elastomeric material. The optionally combining 203 may include combining the polyurethane 222 with particles or fibers containing another polymer, a ceramic and/or graphite to provide polymeric product such as a film or a monolithic object. The optionally combining 203 may include combining the polyurethane 222 with a monomer or prepolymer for another polymer, and then polymerizing the monomer or prepolymer. For example, a polyurethane may be combined with siloxane monomers and/or prepolymers, which may then be polymerized to form a polysiloxane containing the polyurethane.

The optionally crosslinking 204 the polyurethane 222 may include exposing the polyurethane 222 to a crosslinking agent. Examples of crosslinking agents include substances having two or more functional groups that can react with urethane, urea, allophanate and/or biuret groups in the polymer chain. Examples of substances having two or more functional groups that can react with residual isocyanate or hydroxyl groups in the polymer. Crosslinking agents may include substances having two or more functional groups such as hydroxyl groups, amine groups, carboxylic acid groups, acid halide groups, or having a combination of these groups. Examples of crosslinking agents also include substances having two or more functional groups that may react with the carbon-carbon double bonds in the group derived from the metathesized natural oil. Examples of such substances include but are not limited to sulfur, divinyl benzene, prepolymers having carbon-carbon double bonds at or near their chain ends, and combinations thereof.

In some other embodiments, the polyurethane block copolymer can be formed by including a long-chain polyol in the reaction mixture with the short-chain polyol, the diisocyanate, and other optional materials, such as a compound of formula (Ia) and/or additional monomers, such as an amine.

EXAMPLES

The following examples are provided to illustrate one or more preferred embodiments of the invention. Numerous variations can be made to the following examples that lie within the scope of the invention.

Example 1

Formation of Hydroxyl-Functional Monomer

A monomer having at least two hydroxyl functional groups was formed by reacting a metathesized natural oil and a bis(hydroxyalkyl)amine. Diethanolamine (150 grams (g)) and potassium t-butoxide (3.5 g) were combined in a flask equipped with a condenser, and the mixture was heated to 115° C. and stirred. To this mixture, metathesized soybean oil (MSBO; 400 g) was added dropwise. Table 1 lists the reactants present in the reaction mixture.

TABLE 1

Reactants used to form monomer having at least two hydroxyl groups

|  | MSBO | Diethanolamine | potassium t-butoxide |
|---|---|---|---|
| molecular weight | 200* | 105.14 g/mol | 112.21 g/mol |
| mass | 400 g | 150 g | 3.5 g |
| moles | 1.426 | 1.427 | 0.312 |
| equivalents | 1 | 1 | 0.022 |

*saponification value

The mixture was maintained at 115° C. for 1.5 hours after the MSBO addition was complete. The mixture was allowed to cool, and was then dissolved in diethyl ether, washed with a saturated sodium chloride solution, and dried. The ether was removed from the product by rotary evaporation to provide a mixture of monomers having at least two hydroxyl functional groups and containing a group derived from the MSBO.

Characterization of the product by Fourier Transform Infrared Spectroscopy (FTIR) was consistent with full conversion of the ester groups in the MSBO to N,N-diethanolamide groups. The hydroxyl value (OHV) was determined to be 285, which corresponds to 5.079 millimoles of hydroxyl groups per gram.

Example 2

Formation of Polyurethane

A polymer was formed by reacting a first monomer having at least two isocyanate functional groups and a second monomer having at least two hydroxyl functional groups, where the second monomer having at least two hydroxyl functional groups is the reaction product of a metathesized natural oil and a bis(hydroxyalkyl)amine. The monomer having at least two hydroxyl functional groups of Example 1 and 4,4'-diphenylmethane diisocyanate were combined in a flask, and the mixture was heated to 50° C. and stirred. Table 2 lists the amounts of the monomer having at least two hydroxyl functional groups of Example 1 (M) and of the 4,4'-diphenylmethane diisocyanate (MDI;

250.26 grams per mole) used in four separate polymerization reactions. The equivalents of the monomer (M) are expressed in units of millilmoles of hydroxyl groups (mmol OH), and the equivalents of the diisocyanate (MDI) are expressed in units of millimoles of isocyanate groups (mmol NCO). The percent reaction was determined as the percentage of hydroxyl groups that had reacted.

TABLE 2

Reactants used to form polyurethanes

|  |  | A | B | C | D |
|---|---|---|---|---|---|
| M | grams | 10 | 10 | 10 | 10 |
|  | equivalents (mmol OH) | 50.79 | 50.79 | 50.79 | 50.79 |
| MDI | grams | 6.355 | 4.767 | 3.178 | 1.589 |
|  | equivalents (mmol NCO) | 50.79 | 38.10 | 25.40 | 12.70 |
| MDI:M | Molar Ratio | 1:1 | 1:1.3 | 1:2 | 1:4 |
|  | % Reaction | 100 | 75 | 50 | 25 |

Characterization of the products by Fourier Transform Infrared Spectroscopy (FTIR) was consistent with the formation of urethane groups from the hydroxyl and isocyanate groups of the monomers. The resulting polymeric products were gels.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

What is claimed is:

1. A polyurethane, comprising one or more constitutional units according to formula (I):

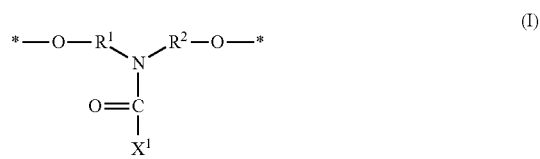

wherein:
- $R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$;
- $R^3$ is a halogen, $C_{1-6}$ alkyl, —OH, $C_{1-6}$ alkoxy, —$NH_2$, —$NH(C_{1-6}$ alkyl), —$N(C_{1-6}$ alkyl)$_2$, $C_{1-6}$ haloalkyl, or $C_{1-6}$ haloalkoxy;
- $X^1$ is 8-nonenyl, 9-decenyl, or 10-undecenyl, each of which is optionally substituted one or more times by groups selected independently from $R^3$; or $X^1$ is —$X^2$-$G^1$;
- $X^2$ is $C_{4-28}$ alkylene or $C_{4-28}$ alkenylene, each of which is optionally substituted one or more times by groups selected independently from $R^3$;

$G^1$ is $$*-\overset{O}{\underset{\|}{C}}-N\begin{array}{c}R^4\cdot O-X^4\\ \\ R^5\cdot O-X^5;\end{array}$$

$R^4$ and $R^5$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$; and $X^4$ and $X^5$ are independently a hydrogen atom or a polymer or polymer sequence, which is a polyurethane, a polyether, or a polyester.

2. The polyurethane of claim 1, wherein $R^1$ and $R^2$ are independently $C_{1-8}$ alkylene, which is optionally substituted one or more times with substituents selected independently from $R^3$.

3. The polyurethane of claim 2, wherein $R^1$ and $R^2$ are independently $-CH_2-$, $-(CH_2)_2-$, $-(CH_2)_3-$, $-(CH_2)_4-$, $-(CH_2)_5-$, or $-(CH_2)_6-$.

4. The polyurethane of any one of claim 1, wherein $X^1$ is $-X^2-G^1$.

5. The polyurethane of claim 4, wherein $X^2$ is $-(CH_2)_7-CH=CH-(CH_2)_7-$, $-(CH_2)_7-CH=CH-(CH_2)_8-$, $-(CH_2)_7-CH=CH-(CH_2)_9-$, $-(CH_2)_8-CH=CH-(CH_2)_7-$, $-(CH_2)_8-CH=CH-(CH_2)_8-$, $-(CH_2)_8-CH=CH-(CH_2)_9-$, $-(CH_2)_9-CH=CH-(CH_2)_7-$, $-(CH_2)_9-CH=CH-(CH_2)_8-$, or $-(CH_2)_9-CH=CH-(CH_2)_9-$.

6. The polyurethane of claim 4, wherein $R^4$ and $R^5$ are independently $C_{1-8}$ alkylene, which is optionally substituted one or more times with substituents selected independently from $R^3$.

7. The polyurethane of claim 6, wherein $R^4$ and $R^5$ are independently $-CH_2-$, $-(CH_2)_2-$, $-(CH_2)_3-$, $-(CH_2)_4-$, $-(CH_2)_5-$, or $-(CH_2)_6-$.

8. The polyurethane of claim 1, wherein the polyurethane is a block copolymer comprising a first block and a second block.

9. The polyurethane of claim 8, wherein the first block is formed from a reaction mixture comprising a short-chain diol, a diisocyanate, and a compound of formula (Ia):

$$HO-R^1\underset{\underset{X^1}{\underset{|}{\underset{C}{\overset{\|}{O=C}}}}}{N}R^2-OH,\qquad(Ia)$$

wherein $R^1$, $R^2$, and $X^1$ are the same as defined in any one of claims 1 to 10.

10. The polyurethane of claim 9, wherein $X^4$ and $X^5$ are hydrogen.

11. The polyurethane of claim 9, wherein the mole-to-mole ratio of the short-chain diol to the compound of formula (Ia) in the reaction mixture is at least 10:1.

12. The polyurethane of claim 9, wherein the short-chain diol is a compound of formula (II):

$$HO-X^{11}-OH \qquad (II),$$

wherein:

$X^{11}$ is $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ heteroarylene, or any combination thereof, each of which is optionally substituted one or more times by groups selected independently from $R^{11}$; and $R^{11}$ is halogen, $C_{1-6}$ alkyl, $-OH$, $C_{1-6}$ alkoxy, $-NH_2$, $-NH(C_{1-6}$ alkyl$)$, $-N(C_{1-6}$ alkyl$)_2$, $C_{1-6}$ haloalkyl, or $C_{1-6}$ haloalkoxy.

13. The polyurethane of claim 12, wherein $X^{11}$ is $C_{1-20}$ alkylene or $C_{2-20}$ polyalkyleneoxide.

14. The polyurethane of claim 12, wherein the short-chain diol is ethylene glycol, diethylene glycol, triethylene glycol, tetraethylene glycol, pentaethylene glycol, propylene glycol, dipropylene glycol, tripropylene glycol, tetrapropylene glycol, 1,3-propanediol, 1,3-butanediol, 1,4-butanediol, neopentyl glycol, 1,5-pentanediol, 1,6-hexanediol, 1,4-cyclohexanedimethanol, hydroquinone bis(2-hydroxyethyl)ether, or p-di-(2-hydroxyethoxy)benzene.

15. The polyurethane of claim 9, wherein the diisocyanate is a toluene diisocyanate, a methylene diphenyl diisocyanate, a naphthalene diisocyanate, or hexamethylene diisocyanate.

16. The polyurethane of claim 8, wherein the second block comprises a polymer sequence selected from the group consisting of: a polyether, a polyester, a polycarbonate, a polycaprolactone, a polybutadiene, and a polysulfide; and wherein the polymer sequence has a molecular weight of 1,000 Da to 20,000 Da.

17. The polyurethane of claim 16, wherein the polymer sequence is a polyether or a polyester.

18. A method of making a polyurethane resin, the method comprising:

forming a reaction mixture comprising a short-chain diol, a diisocyanate, a long-chain polyol, and a compound of formula (Ia):

$$HO-R^1\underset{\underset{X^1}{\underset{|}{\underset{C}{\overset{\|}{O=C}}}}}{N}R^2-OH;\qquad(Ia)$$

and forming a product mixture comprising a polyurethane resin formed from the short-chain diol, the diisocyanate, the long-chain polyol, and the compound of formula (Ia); wherein:

$R^1$ and $R^2$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$;

$R^3$ is a halogen, $C_{1-6}$ alkyl, $-OH$, $C_{1-6}$ alkoxy, $-NH_2$, $-NH(C_{1-6}$ alkyl$)$, $-N(C_{1-6}$ alkyl$)_2$, $C_{1-6}$ haloalkyl, or $C_{1-6}$ haloalkoxy;

$X^1$ is 8-nonenyl, 9-decenyl, or 10-undecenyl, each of which is optionally substituted one or more times by groups selected independently from $R^3$; or $X^1$ is $-X^2-G^1$;

$X^2$ is $C_{4-28}$ alkylene or $C_{4-28}$ alkenylene, each of which is optionally substituted one or more times by groups selected independently from $R^3$;

$G^1$ is

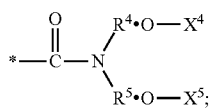

$R^4$ and $R^5$ are independently $C_{1-20}$ alkylene, $C_{2-20}$ alkenylene, $C_{3-14}$ cycloaklylene, $C_{6-14}$ arylene, $C_{1-20}$ heteroalkylene, $C_{2-20}$ heteroalkenylene, $C_{3-14}$ heterocycloaklylene, $C_{6-14}$ hetero-arylene, or any combination thereof, each of which is optionally substituted one or more times by groups selected independently from $R^3$; and $X^4$ and $X^5$ are independently a hydrogen atom or a polymer or polymer sequence, which is a polyurethane, a polyether, or a polyester.

19. The method of claim 18, wherein $X^1$ is —$X^2$-$G^1$.

20. The polyurethane of claim 9, wherein the compound of formula (Ia) is formed from a reaction mixture comprising a dialkanol amine and an ester or acid compound, wherein the ester or acid compound is formed from the metathesis of a natural oil.

21. The method of claim 18, wherein the compound of formula (Ia) is formed from a reaction mixture comprising a dialkanol amine and an ester or acid compound, wherein the ester or acid compound is formed from the metathesis of a natural oil.

22. The polyurethane of claim 1, wherein $X^1$ is unsubstituted 8-nonenyl, 9-decenyl, or 10-undecenyl.

23. The polyurethane of claim 22, wherein $X^1$ is 8-nonenyl.

24. The polyurethane of claim 22, wherein $R^1$ and $R^2$ are both —$(CH_2)_2$—.

25. The polyurethane of claim 23, wherein $R^1$ and $R^2$ are both —$(CH_2)_2$—.

26. The method of claim 18, wherein $X^1$ is unsubstituted 8-nonenyl, 9-decenyl, or 10-undecenyl.

27. The method of claim 26, wherein $X^1$ is 8-nonenyl.

28. The method of claim 26, wherein $R^1$ and $R^2$ are both —$(CH_2)_2$—.

29. The method of claim 27, wherein $R^1$ and $R^2$ are both —$(CH_2)_2$—.

* * * * *